United States Patent [19]
Kawagoe

[11] Patent Number: 6,119,057
[45] Date of Patent: Sep. 12, 2000

[54] AUTONOMOUS VEHICLE WITH AN EASILY SET WORK AREA AND EASILY SWITCHED MODE

[75] Inventor: Nobukazu Kawagoe, Toyonaka, Japan

[73] Assignee: Minolta Co., Ltd., Osaka, Japan

[21] Appl. No.: 09/044,843

[22] Filed: Mar. 20, 1998

[30] Foreign Application Priority Data

Mar. 21, 1997 [JP] Japan .................................. 9-067906

[51] Int. Cl.⁷ ............................................... G06F 17/00
[52] U.S. Cl. ........................ 701/23; 15/319; 15/340.1; 180/167; 701/25; 901/1
[58] Field of Search ................................ 701/23, 25, 26, 701/300; 180/169, 167, 168; 318/568.12, 568.17, 568.16; 901/1; 395/80, 82, 88; 15/319, 320, 340.1, 340.3

[56] References Cited

U.S. PATENT DOCUMENTS

| | | |
|---|---|---|
| 4,674,048 | 6/1987 | Okumura ................................ 701/25 |
| 5,001,635 | 3/1991 | Yasutomi et al. ..................... 701/26 |
| 5,109,566 | 5/1992 | Kobayashi et al. ................... 15/319 |
| 5,309,592 | 5/1994 | Hiratsuka ............................. 15/319 |
| 5,341,540 | 8/1994 | Soupert et al. ...................... 15/319 |
| 5,377,106 | 12/1994 | Drunk et al. ......................... 701/25 |
| 5,402,051 | 3/1995 | Fujiwara et al. .................... 318/587 |
| 5,461,292 | 10/1995 | Zondlo ................................. 318/587 |
| 5,548,511 | 8/1996 | Bancroft .............................. 701/23 |
| 5,657,225 | 8/1997 | Bauer .................................. 701/23 |

*Primary Examiner*—William A. Cuchlinski, Jr.
*Assistant Examiner*—Edward Pipala
*Attorney, Agent, or Firm*—McDermott, Will & Emery

[57] ABSTRACT

An autonomous vehicle which permits a work area to be set without requiring the operator to input a numerical value includes a body, a travel unit for moving said body, a distance measurement unit for measuring the distance from the body to a wall, and a travel control unit for determining a work area depending upon the distance output from the distance measurement unit at the start of operation and controlling the travel unit to travel the body within the determined work area. Note that a method of controlling the traveling of such an autonomous vehicle is claimed as well.

15 Claims, 5 Drawing Sheets

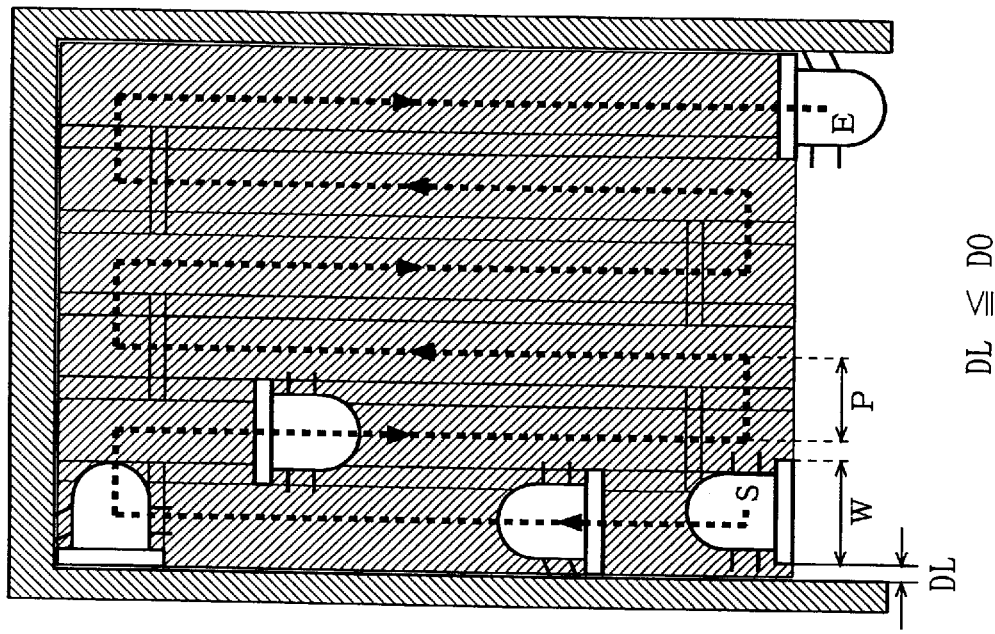
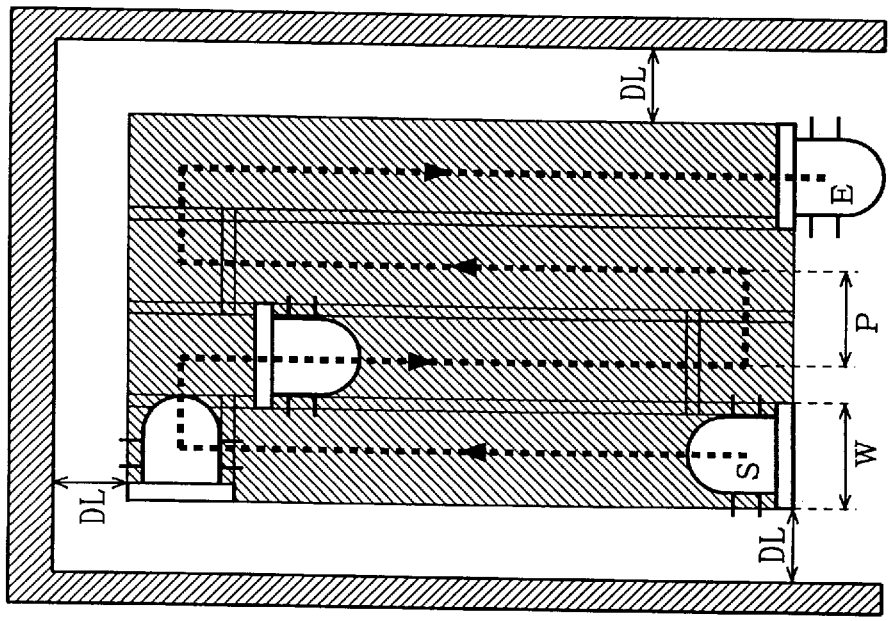

AUTONOMOUS VEHICLE WITH AN EASILY SET WORK AREA AND EASILY SWITCHED MODE

BACKGROUND OF THE INVENTION

1. Field of the Invention

The present invention relates generally to autonomous vehicles which autonomously travel in an area while working and a method of controlling its travel, and more particularly, to an autonomous vehicle which permits its work area to be readily set and its mode to be readily switched, and a method of controlling its travel.

This application is based on Application No. 9-067906 filed in Japan, which is herein incorporated by reference.

2. Description of the Related Art

Floors in an office building or the like are waxed (1) after completely removing the old wax, or (2) after lightly removing only the upper layer of the old wax. The waxing operation (1) is generally performed once every several years and the waxing operation (2) is performed once every one to two months. The work area includes the very limit of the floor up to walls in (1), while only the central part is waxed without waxing the area close to the walls in (2). This is because people usually do not walk so much close to the walls, and the wax around the area becomes less thinner than that in the central area where they often cross.

In such operations using an autonomous vehicle, if the operator can readily give an instruction to select operation (1) or (2) (hereinafter referred to as mode switching), it is very convenient. A conventional autonomous vehicle requires the operator to input numerical values for cumbersome setting of a work area or switching of a mode using a console or the like.

SUMMARY OF THE INVENTION

The present invention is directed to a solution to the problem, and it is an object of the invention to provide an autonomous vehicle which permits a work area to be set without requiring the operator to input a numerical value and a method of controlling its travel.

Another object of the invention is to provide an autonomous vehicle which permits a mode to be switched without requiring the operator to input a numerical value and a method of controlling its travel.

An autonomous vehicle which autonomously travels while working in a work area according to one aspect of the invention includes a body, a travel unit for moving the body, a distance measurement unit for measuring the distance from the body to a wall, and a travel control unit for determining the work area depending upon the distance output from the distance measurement unit at the start of operation to control the travel unit to move the body within the predetermined work area.

The distance from the body to a wall is measured at the start of operation, and operation may be performed excluding an area close to the wall having a width corresponding to the distance. Therefore, the work area may be set without requiring the operator to input a numerical value.

The travel control unit preferably includes a travel control method selecting unit for selecting one of a plurality of travel control methods depending upon the distance from the body to a wall output from the distance measurement unit at the start of operation, and a device for controlling the travel unit such that the body travels according to the travel control method selected by the travel control method selecting unit.

The distance from the body to a wall is measured at the start of operation, and the travel control method selecting unit selects a method of controlling the body to travel. The mode of operation may be switched without requiring the operator to input a numerical value as a result.

The plurality of travel control methods further preferably includes a first travel control method to control the body to travel within the work area separated from the wall by the distance output from the distance measurement unit at the start of operation, and a second travel control method to control the body to move at the start of operation such that the distance from the body to the wall is equal to a first prescribed value and to travel within the work area separated from the wall by the first prescribed value. The travel control method selecting unit includes a device to select the first travel control method if the distance from the body to the wall output from the distance measurement unit at the start of operation is larger than a second prescribed value, and the second travel control method if the distance from the body to the wall output from the distance measurement unit at the start of operation is smaller than the second prescribed value.

The distance from the body to a wall is measured at the start of operation, operation is performed excluding a region close to the wall having a width corresponding to the measured distance if the distance is larger than the second prescribed value, and operation is performed excluding a region close to the wall having a width corresponding to the first prescribed value if the distance is smaller than the second prescribed value. Therefore, the work area may be set or the mode may be switched without requiring the operator to input a numerical value.

Further preferably, the second prescribed value is larger than the first prescribed value. If the distance from the body to a wall at the start of operation is not more than the second prescribed value, the body is moved toward the wall until the distance is equal to the first prescribed value, and operation is performed excluding a region close to the wall having a width corresponding to the first prescribed value. Therefore, an accurate work area may be specified simply by placing the autonomous vehicle at an approximate position at the time of operating up to the very limit of the floor close to the wall.

An autonomous vehicle which autonomously travels within a cleaning work area while cleaning according to another aspect of the invention includes a body, a travel unit for moving the body, a distance measurement unit for measuring the distance from the body to a wall, a cleaning work area setting unit for setting the cleaning work area depending upon the distance output from the distance measurement unit at the start of cleaning operation, and a travel control unit for controlling the travel unit such that the body travels while cleaning within the cleaning work area set by the cleaning work area setting unit.

The distance from the body to a wall is measured at the start of cleaning operation and the cleaning work area setting unit sets a cleaning work area excluding a region close to the wall having a width corresponding to the distance. The autonomous vehicle performs cleaning operation within the cleaning work area. Therefore, the cleaning work area may be set without requiring the operator to input a numerical value.

The cleaning work area setting unit preferably includes a first device to select one of a plurality of cleaning work areas depending upon the distance from the body to the wall output from the distance measurement unit at the start of cleaning operation.

The distance from the body to the wall is measured at the start of cleaning operation and the first device selects a cleaning work area depending upon the distance. Therefore, the mode may be switched without requiring the operator to input a numerical value.

Further preferably, the plurality of cleaning work areas include a first cleaning work area separated from the wall by the distance output from the distance measurement unit at the start of cleaning operation and a second cleaning work area separated from the wall by a distance corresponding to a first prescribed value. The first device includes a device to select the first cleaning work area if the distance from the body to the wall output from the distance measurement unit at the start of cleaning operation is larger than a second prescribed value, and the second cleaning work area if the distance from the body to the wall output from the distance measurement unit at the start of cleaning operation is smaller than the second prescribed value.

The distance from the body to a wall is measured at the start of cleaning operation, and the first device selects the first cleaning work area or second cleaning work area depending upon the distance. The autonomous vehicle performs cleaning operation within the work area. Therefore, the cleaning work area may be set or the mode may be switched without requiring the operator to input a numerical value.

Further preferably, the second prescribed value is larger than the first prescribed value. If the distance from the body to a wall at the start of cleaning operation is not larger than the second prescribed value, cleaning operation is performed within the cleaning work area up to the very limit of the floor close to the wall. Therefore, an accurate cleaning work area may be set simply by placing the autonomous vehicle at an approximate position.

A method of controlling the traveling of an autonomous vehicle according to yet another aspect of the invention includes a first step of measuring the distance from the autonomous vehicle to an obstacle, a second step of comparing the distance measured in the first step and a first prescribed distance, a third step of controlling the autonomous vehicle to travel such that the distance from the autonomous vehicle to the obstacle is equal to the distance measured in the first step if the distance measured in the first step is larger than the first prescribed distance, and a fourth step of controlling the autonomous vehicle to travel such that the distance from the autonomous vehicle to the obstacle is equal to a second prescribed distance smaller than the first prescribed distance.

The distance from the autonomous vehicle to an obstacle is measured at the start of operation, operation is performed excluding a region very close to the obstacle having a width depending upon the distance if the distance is larger than a first prescribed value, and operation is performed excluding a region close to the obstacle having a width corresponding to a second prescribed value smaller than the first prescribed value if the distance is smaller than the first prescribed value. Therefore, the work area may be set or the mode may be switched without requiring the operator to input a numerical value, and an accurate work area may be specified simply by placing the autonomous vehicle at an approximate position at the time of operation up to a position very close to the obstacle.

A method of controlling the traveling of the autonomous vehicle according to a still further aspect of the invention includes a first step of measuring the distance from the autonomous vehicle to an obstacle, a second step of comparing the distance measured in the first step and a first prescribed distance, a third step of controlling the autonomous vehicle such that the autonomous vehicle travels within a work area separated from the obstacle by the distance measured in the first step if the distance measured in the first step is larger than the first prescribed distance, and a fourth step of controlling the autonomous vehicle to travel within a work area separated from the obstacle by a second prescribed distance smaller than the first prescribed distance.

The distance from the autonomous vehicle to an obstacle is measured at the start of operation, operation is performed excluding a region close to the obstacle having a width corresponding to the distance if the distance is larger than a first prescribed value, and operation is performed excluding a region close to the obstacle having a width corresponding to a second prescribed value smaller than the first prescribed value if the distance is smaller than the first prescribed value. The work area may be set or the mode may be switched without requiring the operator to input a numerical value, and an accurate work area may be specified simply by placing the autonomous vehicle at an approximate position at the time of operation up to a position very close to the obstacle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are view showing the procedure of the travel of the autonomous vehicle according to the embodiment of the invention.

DESCRIPTION OF THE PREFERRED EMBODIMENTS

An autonomous vehicle according to one embodiment of the invention will be now described in conjunction with the accompanying drawings.

Figure 1:
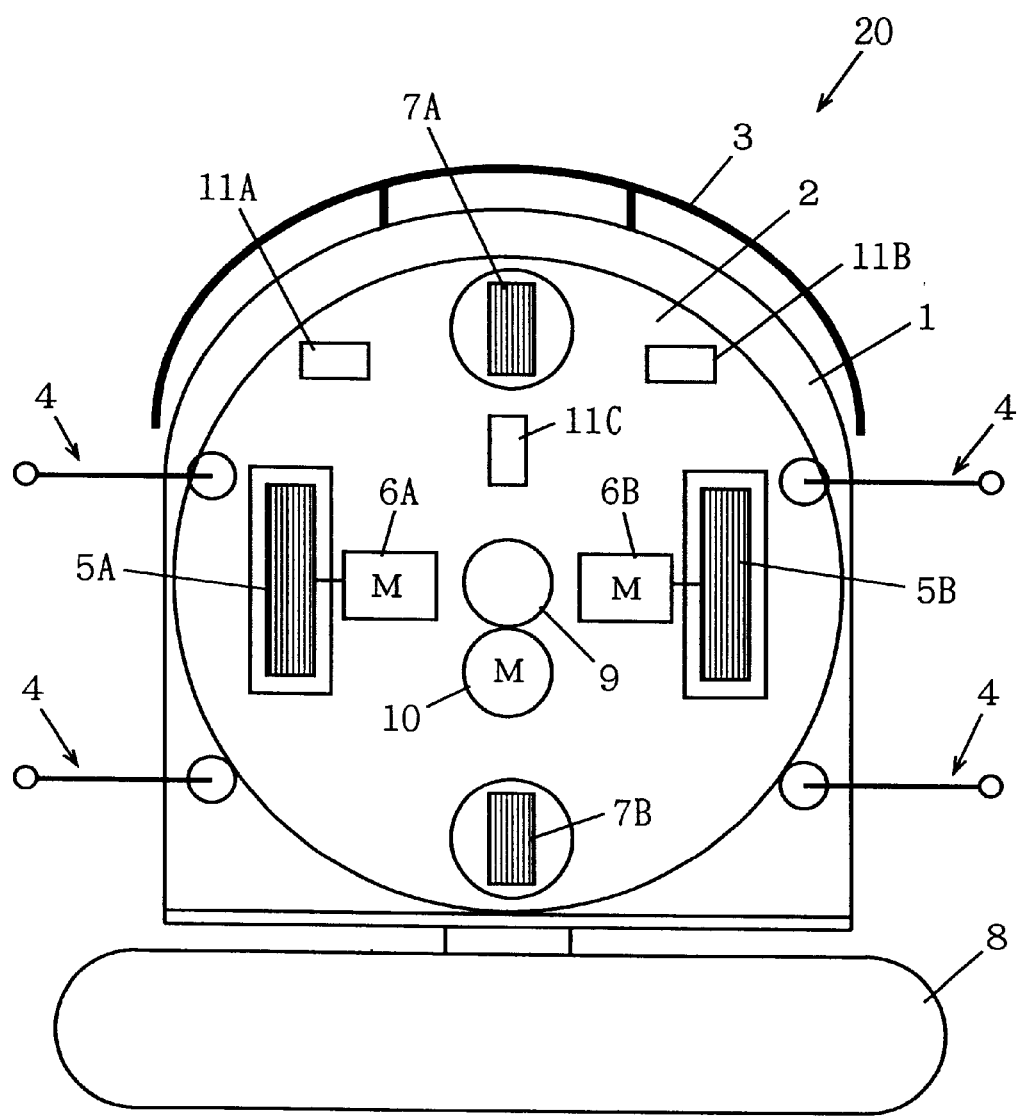
FIG. 1 is a top sectional view of an autonomous vehicle according to one embodiment of the invention.

Referring to FIG. 1, autonomous vehicle 20 includes a travel unit 2 for moving the vehicle back and forth, and right and left, a body unit 1 attached to the upper part of travel unit 2 and rotatable relative to travel unit 2 around a rotating axis 9 perpendicular to a floor surface, a motor 10 for rotating body unit 1 relative to travel unit 2 around rotating axis 9, a front obstacle sensor 3 for detecting the vehicle touching an obstacle in the front and outputting an obstacle detection signal, two pairs of side tracing sensors 4 attached to the front and back on the right and left side surfaces of body 1 and in contact with a wall for outputting information indicating distance to the wall, left side distance measurement sensor 11A, right side distance measurement sensor 11B and front distance measurement sensor 11C for measuring distance to an obstacle present in the left, right and front for output, respectively, and a waxing unit 8 coupled to body unit 1 for waxing a floor.

Travel unit 2 includes a left side driving wheel 5A and a right side driving wheel 5B for driving autonomous vehicle 20 to move the vehicle forward and backward, rotate or turn, a left side driving motor 6A for driving left side driving wheel 5A, a right side driving motor 6B for driving right side driving wheel 5B, a front side rotatable caster wheel 7A and back side rotatable caster wheel 7B for rotating and turning.

Left side distance measurement sensor 11A, right side distance measurement sensor 11B and front distance measurement sensor 11C are formed by an ultrasonic sensor or an optical distance measurement sensor.

Figure 2:
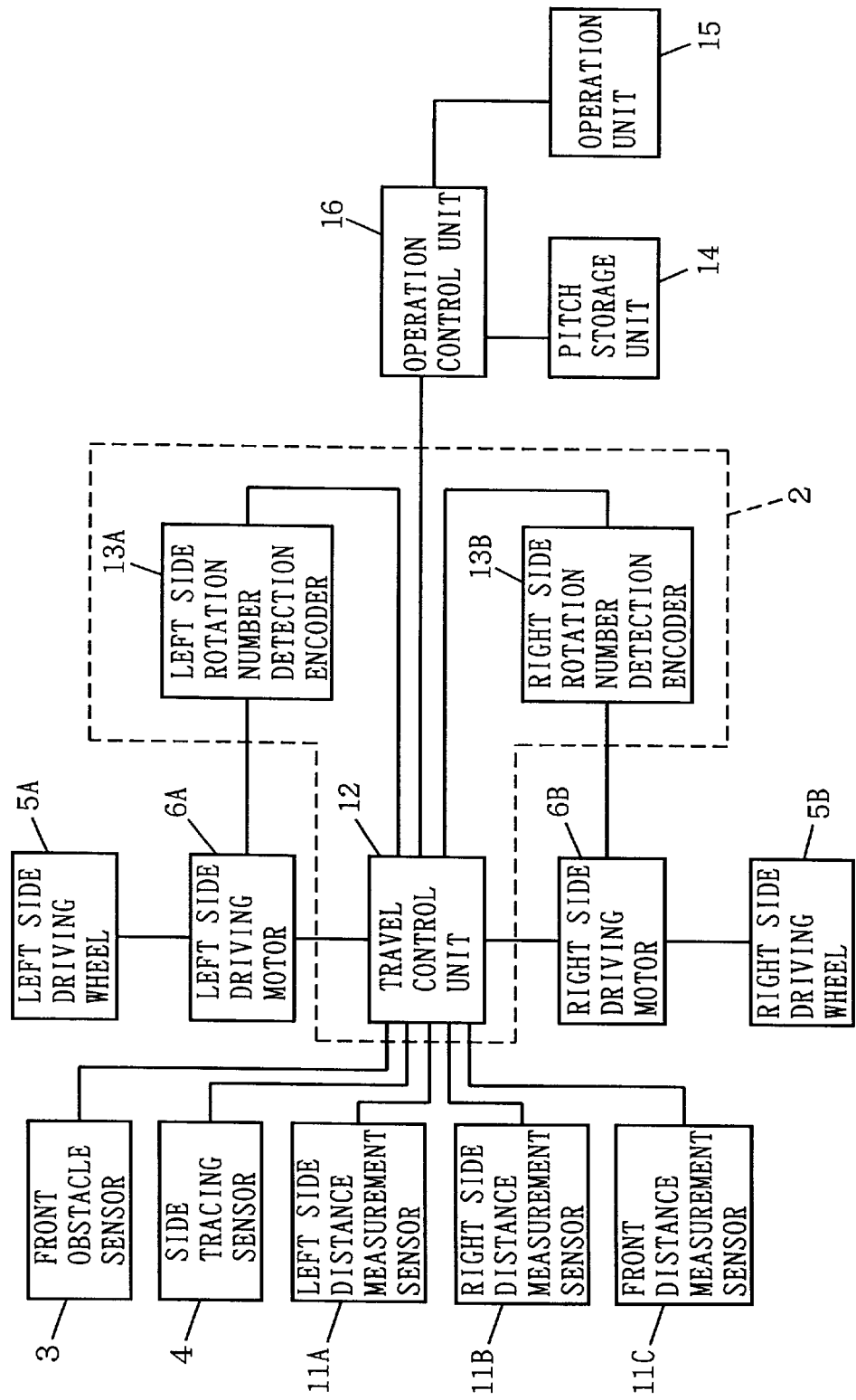
FIG. 2 is a block diagram of the configuration of the autonomous vehicle according to the embodiment of the invention.

Referring to FIG. 2, a portion related to control of autonomous vehicle 20 will be described in further detail. Autonomous vehicle 20 includes an operation control unit 16 for performing operations related to control of autonomous vehicle 20, an operation unit 15 including a key switch used by the operator to input various setting values and give instructions to operation control unit 16 and a display portion, and a pitch storage unit 14 for storing the width between lanes when autonomous vehicle 20 goes and returns.

Travel unit 2 includes a left side rotation number detection encoder 13A for measuring the number of rotation of left side driving motor 6A for output, a right side rotation number detection encoder 13B for measuring the number of rotations of right side driving motor 6B for output, and a travel control unit 12 which receives the number of rotations output from left side rotation number detection encoder 13A, the number of rotations output from right side rotation number detection encoder 13B, an obstacle detection signal output from front obstacle sensor 3, a voltage value output from side tracing sensor 4 to obtain the distance to an object in contact therewith, the distance to a left wall output from left side distance measurement sensor 11A, the distance to a right wall output from right side distance measurement sensor 11B, and the distance to a front wall output from front distant measurement sensor 11C, and controls the traveling of travel unit 2 such as front travel, backward travel, rotation travel and turning travel while controlling the rotation number of each of left side driving motor 6A and right side driving motor 6B.

In order to move autonomous vehicle 20 forward or backward, travel control unit 12 sets left side driving motor 6A and right side driving motor 6B to operate in the same rotation direction and at the same rotation number.

In order to rotate autonomous vehicle 20, travel control unit 12 sets left side driving motor 6A and right side driving motor 6B to rotate in the opposite directions at the same rotation number. If left side driving motor 6A is provided with rotation in the rotation direction to move the vehicle forward, and right side driving motor 6B is provided with rotation in the rotation direction to move the vehicle backward, autonomous vehicle 20 rotates clockwise at the position. When left side driving motor 6A is provided with rotation in the rotation direction to move the vehicle backward, and right side driving motor 6B is provided with rotation in the rotation direction to move the vehicle forward, autonomous vehicle 20 rotates anticlockwise at the position.

In order to make autonomous vehicle 20 turn, travel control unit 12 sets left side driving motor 6A and right side driving motor 6B to rotate in the same direction at the different rotation numbers. If the rotation number of left side driving motor 6A is larger than the rotation number of right side driving motor 6B, autonomous vehicle 20 turns to the right. If the rotation number of left side driving motor 6A is smaller than that of right side driving motor 6B, autonomous vehicle 20 turns to the left.

Figure 3:
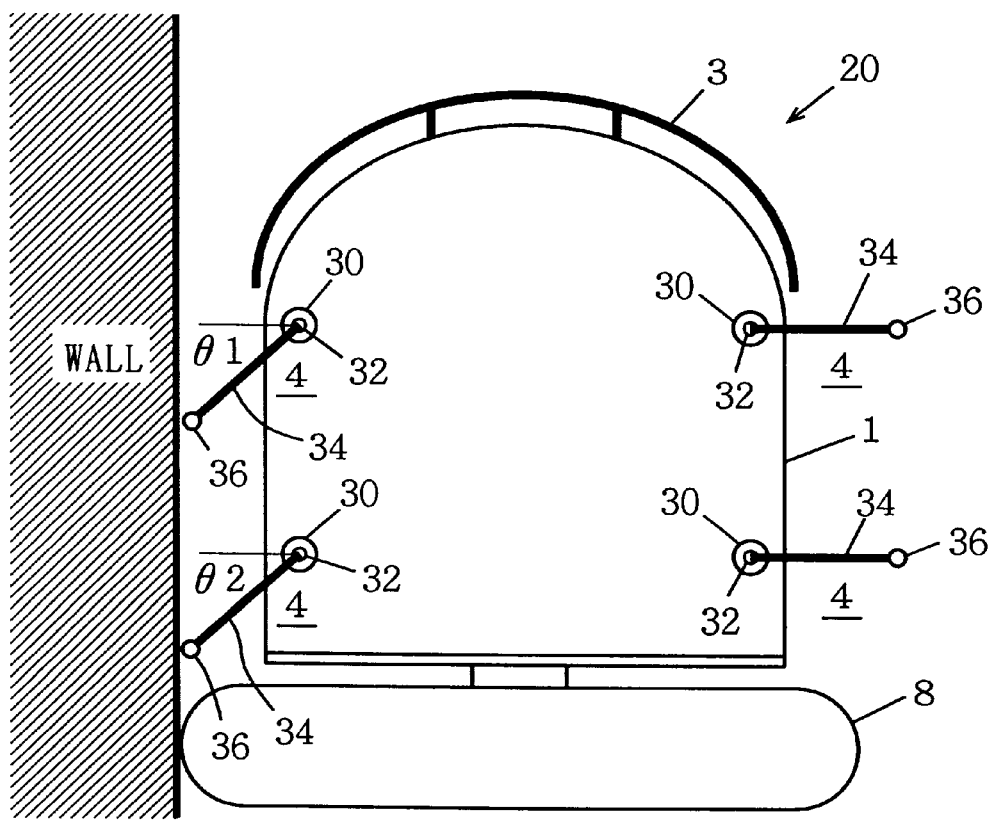
FIG. 3 is a schematic view for use in illustration of the principle of measuring distance using a side tracing sensor.

Referring to FIG. 3, side tracing sensor 4 will be described in detail. Side tracing sensor 4 includes potentiometer 30 attached to a shaft 32 perpendicular to the surface of autonomous vehicle 20 in contact with the floor and a rod 34 protruding transversely from the shaft of potentiometer 30 which is not shown, and a sphere 36 attached to the tip end of rod 34 for not damaging a wall.

If, for example, autonomous vehicle 20 travels along a left wall, rod 34 rotates depending upon the distance to the wall, and the angle of rotation at the time is measured as an output voltage value by potetiometer 30. The angles of rotations of rods 34 in the front and back on the left side of body 1 are $\theta 1$ and $\theta 2$, respectively. Based on the angles of rotation $\theta 1$ and $\theta 2$, the degree of how parallel to each other the left wall and the autonomous vehicle 20 are and the distance therebetween are calculated by travel control unit 12. Travel control unit 12 controls autonomous vehicle 20 to continuously travel at a fixed distance and parallel to the wall.

Figure 4:
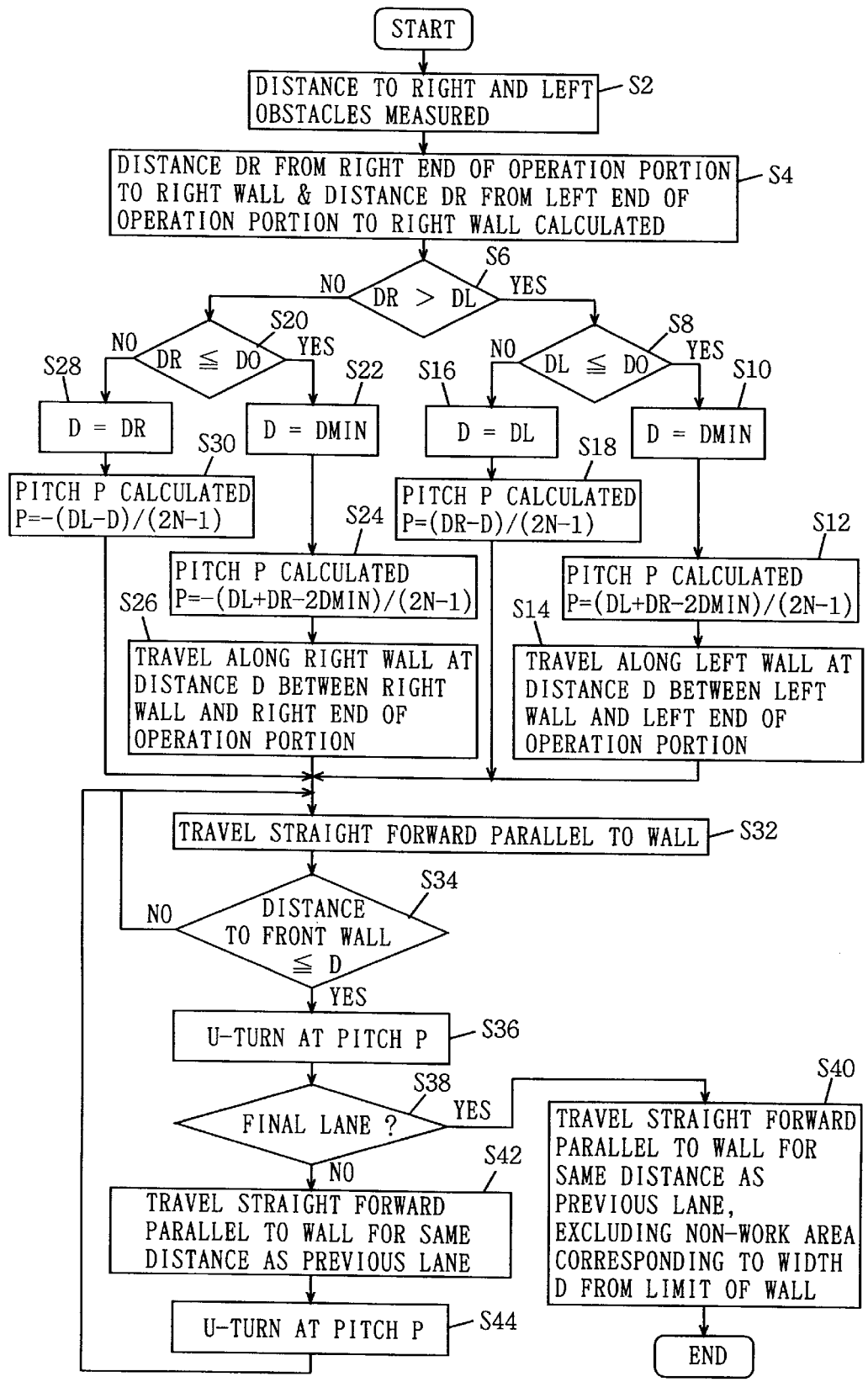
FIG. 4 is a flow chart for use in illustration of controlling of the travel of the autonomous vehicle according to the embodiment of the invention.

Referring to FIGS. 4, 5A and 5B, the procedure of controlling the traveling of autonomous vehicle 20 will be described in detail. In the control, after initialization, control of reciprocating traveling as shown in FIGS. 5A and 5B is started.

FIG. 5A shows the trajectory and work area of autonomous vehicle 20 when its travel is controlled based on the first travel control method. FIG. 5B shows the trajectory and work area of autonomous vehicle 20 when its travel is controlled based on the second travel control method. As shown in FIGS. 5A and 5B, autonomous vehicle 20 works while going and returning in a work area having three sides surrounded by walls. The position for autonomous vehicle 20 to start traveling is denoted by S in FIGS. 5A and 5B, and the position of the end of traveling is denoted by E. The operator desirably removes autonomous vehicle 20 from the work area without spoiling the already waxed surface. Hence, the width between lanes P (hereinafter referred to as "pitch") and the number of reciprocating movements N are calculated such that the position of the end of traveling is present in the vicinity of the remaining one side not surrounded by a wall. The position of starting S is determined by the operator in the vicinity of the one side not surrounded by walls. The lane refers to the trajectory of autonomous vehicle 20 as it travels straight forward. The number of U-turns autonomous vehicle 20 makes is expressed by 2N−1. In FIG. 5A, the number of reciprocating movements N=2, the number of U-turns (2N−1)=3, while in FIG. 5B, the number of reciprocating movements N=3 and the number of U-turns (2N−1)=5.

During initialization, the number of reciprocating movements N and pitch P at the time of reciprocating traveling are produced, and autonomous vehicle 20 moves to a position separated from a wall at a prescribed distance depending upon the distance from autonomous vehicle 20 to the wall (FIG. 5B).

At the start of traveling (at point S in FIGS. 5A and 5B), travel control unit 12 measures the distances to left and right walls using left side distance measurement sensor 11A and right side distance measurement sensor 11B, respectively (S2). Based on the distance measured in S2, operation control unit 16 calculates distance DR from the right end of waxing unit 8 to the right wall and distance DL from the left end to the left wall (S4). If autonomous vehicle 20 is closer to the left wall than to the right wall (YES in S6), operation control unit 16 compares distance DL to a prescribed value D0 (S8). If distance DL is not more than prescribed value D0 (YES in S8, FIG. 5B), operation control unit 16 sets a width D not to be waxed to a prescribed value DMIN (S10). D0 is usually set to about 10 cm, and DMIN is set to a distance sufficiently close to the wall (normally as small as about 5 mm). Then, the number of reciprocating movements N and pitch P when autonomous vehicle 20 goes and returns are calculated (S12). P represents the width between a going path and a returning path as shown in FIG. 5B. N and P are determined such that N is a natural number, P is maximized at P<W, and distance DL to the left wall at the final lane is D. Herein, W represents the width of waxing unit 8, and a positive value for P is measured to the right in the figures. Travel control unit 12 controls autonomous vehicle 20 to travel along the left wall such that DL is D (S14). If DL is larger than D0 (NO in S8, FIG. 5A), travel control unit 12 controls autonomous vehicle 20 to start traveling from that position, rather than making the vehicle travel along the left wall. Therefore, distance D not to be waxed=DL (S16), and the number of reciprocating movements N and pitch P are calculated similarly to S12 (S18).

If autonomous vehicle 20 is closer to the right wall than to the left wall (NO in S6), travel control unit 12 controls autonomous vehicle 20 to travel along the right wall as necessary, similarly to the case in which the vehicle is closer to the left wall, and operation control unit 16 calculates the number of reciprocating movements N and pitch P (S20 to S30).

During controlling the reciprocating traveling, autonomous vehicle 20 is controlled to travel back and forth straight forward within a working area excluding distance D from the wall for waxing the floor. At the time, the number of reciprocating movements N and pitch P produced in the initialization are used.

Autonomous vehicle 20 moves straight forward to be parallel to a wall from the position to start operating (S32). If the wall and side tracing sensor 4 are in contact, travel control unit 12 produces the distance to the wall and the direction of autonomous vehicle 20 based on angular information by a voltage value output from the sensor. Travel control unit 12 controls the vehicle to travel straight forward based on the information. Otherwise, travel control unit 12 controls the vehicle to travel straight forward such that the distance to the wall output from each of left side distance measurement sensor 11A and right side distance measurement sensor 11B is fixed. During controlling the vehicle to travel straight forward (S32), the distance to the front wall and width D not to be waxed are compared from time to time (S34), if the distance to the front wall reaches D (YES in S34), the vehicle is controlled to make a U-turn to transit to the next lane at pitch P (S36). The distance to the wall is produced by front distance measurement sensor 11C. The next lane, in other words, the returning path could be the final lane. Travel control unit 12 determines if the lane is final or not (S38). If the lane is final (YES in S38), travel control unit 12 controls the vehicle to travel straight forward for the distance the same as the previous lane parallel to the wall leaving a part corresponding to width D unworked, and then ends the control of traveling. If the lane is not final (NO in S38), travel control unit 12 controls autonomous vehicle 20 to travel straight forward for the same distance as the previous lane to be parallel to the wall (S42). Travel control unit 12 further controls the vehicle to make a U-turn at pitch P similarly to S36 (S44), and the control in and after S32 is performed until the final lane.

By the above-described controls, if the distance from waxing unit 8 to a wall is larger than prescribed value D0, autonomous vehicle 20 waxes a work area separated from the wall at the distance while traveling in the area. If the distance to the wall is smaller than prescribed value D0, autonomous vehicle 20 waxes a work area separated from the wall at prescribed value DMIN while traveling in the work area. Therefore, the work area may be set simply by placing autonomous vehicle 20 at an approximate position without requiring the operator to input a numerical value. If there are walls on both sides of autonomous vehicle 20 and there is no wall in the front, the operator may input a numerical value for the length of the work area in the front direction to set a work area. Thus, switching between the modes for waxing only the central part and waxing up to the very limit of the floor close to the wall may be automatically switched.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An autonomous vehicle autonomously traveling in a work area for operation, comprising:

a body;

a travel unit for moving said vehicle;

a distance measurement unit for measuring the distance from said body to a wall; and a travel control unit for controlling said travel unit to determine said work area depending upon said distance output from said distance measurement unit at the start of operation and to move said body within said determined work area.

2. The autonomous vehicle as recited in claim 1, wherein said travel control unit includes, a travel control method selecting unit for selecting one of a plurality of travel control methods depending upon said distance from said body to said wall output from said distance measurement unit at the start of operation, and a control unit for controlling said travel unit such that said body travels according to the travel control method selected by said travel control method selecting unit.

3. The autonomous vehicle as recited in claim 2, wherein said plurality of travel control methods include, a first travel control method to control said body to travel within said work area separated from said wall by said distance output from said distance measurement unit at the start of operation, and a second travel control method to control said body to travel at the start of operation such that said distance from said body to said wall is equal to a first prescribed value and to control said body to travel within said work area separated from said wall by said first prescribed value, and said travel control method selecting unit includes a unit for selecting said first travel control method if said distance from said body to said wall output from said distance measurement unit at the start of operation is larger than a second prescribed value, and said second travel control method if said distance from said body to said wall output from said distance measurement unit at the start of operation is smaller than said second prescribed value.

4. The autonomous vehicle as recited in claim 3, wherein said second prescribed value is larger than said first prescribed value.

5. The autonomous vehicle as recited in claim 1, wherein said operation is a waxing operation.

6. The autonomous vehicle as recited in claim 5, wherein said travel control unit includes,
- a travel control method selecting unit for selecting one of a plurality of travel control methods depending upon said distance from said body to said wall output from said distance measurement unit at the start of operation, and
- a control unit for controlling said travel unit so that said body travels according to the travel control method selected by said travel control method selecting unit.

7. The autonomous vehicle as recited in claim 6, wherein said plurality of travel control methods include,
- a first travel control method to control said body to travel within said work area separated from said wall by said distance output from said distance measurement unit at the start of operation, and
- a second travel control method to control said body to travel at the start of operation such that said distance from said body to said wall is equal to a first prescribed value and to control said body to travel within said work area separated from said wall by said first prescribed value, and
- said travel control method selecting unit includes a unit for selecting said first travel control method if said distance from said body to said wall output from said distance measurement unit at the start of operation is larger than a second prescribed value, and said second travel control method if said distance from said body to said wall output from said distance measurement unit at the start of operation is smaller than said second prescribed value.

8. The autonomous vehicle as recited in claim 7, wherein said second prescribed value is larger than said first prescribed value.

9. An autonomous vehicle autonomously traveling within a cleaning work area for cleaning, comprising:
- a body;
- a travel unit for moving said body;
- a distance measurement unit for measuring the distance from said body to a wall;
- a cleaning working area setting unit for setting said cleaning work area depending upon said distance output from said distance measurement unit at the start of cleaning operation; and
- a travel control unit for controlling said travel unit to control said body to travel within said cleaning work area set by said cleaning work area setting unit for cleaning.

10. The autonomous vehicle as recited in claim 9, wherein said cleaning work area setting unit includes a first unit for selecting one of a plurality of cleaning work areas depending upon said distance from said body to said wall output from said distance measurement unit at the start of cleaning operation.

11. The autonomous vehicle as recited in claim 10, wherein
said plurality of cleaning work areas include,
- a first cleaning work area separated from said wall by said distance output from said distance measurement unit at the start of cleaning operation, and
- a second cleaning work area separated from said wall by a first prescribed value, and
- said first unit selects said first cleaning work area if said distance from said body to said wall output from said distance measurement unit at the start of cleaning operation is larger than a second prescribed value, and said second cleaning work area if said distance from said body to said wall output from said distance measurement unit at the start of cleaning operation is smaller than said second prescribed value.

12. The autonomous vehicle as recited in claim 11, wherein
said second prescribed value is larger than said first prescribed value.

13. The autonomous vehicle as recited in claim 9, wherein said cleaning operation is a waxing operation.

14. A method of controlling the traveling of an autonomous vehicle, comprising:
- a first step of measuring the distance from said autonomous vehicle to an obstacle;
- a second step of comparing said distance measured in said first step and a first prescribed distance;
- a third step of controlling said autonomous vehicle to travel such that the distance from said autonomous vehicle to said obstacle is equal to said distance measured in said first step, if said distance measured in said first step is larger than said first prescribed distance, and
- a fourth step of controlling said autonomous vehicle to travel such that said distance from said autonomous vehicle to said obstacle is equal to a second prescribed distance smaller than said first prescribed distance, if said distance measured in said first step is smaller than said first prescribed distance.

15. A method of controlling the traveling of an autonomous vehicle, comprising:
- a first step of measuring the distance from said autonomous vehicle to an obstacle;
- a second step of comparing said distance measured in said first step and a first prescribed distance;
- a third step of controlling said autonomous vehicle to travel within a work area separated from said obstacle by said distance measured in said first step, if said distance measured in said first step is larger than said first prescribed distance; and
- a fourth step of controlling said autonomous vehicle to travel within said work area separated from said obstacle by a second prescribed distance smaller than said first prescribed distance, if said distance measured in said first step is smaller than said first prescribed distance.

* * * * *